United States Patent
Ibrahim et al.

(10) Patent No.: US 8,130,743 B2
(45) Date of Patent: Mar. 6, 2012

(54) CELLULAR RADIOTELEPHONE SIGNAL PERMITTING SYNCHRONIZATION OF A SUPPLEMENTARY CHANNEL BY MEANS OF A PRINCIPAL CHANNEL AND CORRESPONDING METHOD, TERMINAL AND BASE STATION

(75) Inventors: Nicolas Ibrahim, Montigyn le Bretonneux (FR); Dragan Vujcic, Limours (FR)

(73) Assignee: Wavecom, Issy-les-Moulineaux (FR)

( * ) Notice: Subject to any disclaimer, the term of this patent is extended or adjusted under 35 U.S.C. 154(b) by 672 days.

(21) Appl. No.: 10/589,542

(22) PCT Filed: Feb. 10, 2005
(Under 37 CFR 1.47)

(86) PCT No.: PCT/FR2005/000319
§ 371 (c)(1),
(2), (4) Date: Apr. 17, 2008

(87) PCT Pub. No.: WO2005/084062
PCT Pub. Date: Sep. 9, 2005

(65) Prior Publication Data
US 2008/0248806 A1 Oct. 9, 2008

(30) Foreign Application Priority Data
Feb. 16, 2004 (FR) ...................... 04 01545

(51) Int. Cl.
*H04J 3/06* (2006.01)
(52) U.S. Cl. .............. 370/350; 455/550.1; 455/561; 455/452.1; 370/349
(58) Field of Classification Search .......... 370/349, 370/350; 455/452.1, 550.1, 561
See application file for complete search history.

(56) References Cited

U.S. PATENT DOCUMENTS
6,084,871 A 7/2000 Engstrom et al. ............. 370/350
(Continued)

FOREIGN PATENT DOCUMENTS
WO  WO 99/53644  10/1999
(Continued)

OTHER PUBLICATIONS

"3$^{rd}$ Generation Partnership Project; Technical Specification Group Radio Access Network; High Speed Downlink Packet Access; Physical Layer Aspects (Release 5)", XP002192345, Dec. 2001, pp. 3-23.

(Continued)

*Primary Examiner* — Jinsong Hu
*Assistant Examiner* — Qun Shen
(74) *Attorney, Agent, or Firm* — David D. Brush; Westman, Champlin & Kelly, P.A.

(57) ABSTRACT

The disclosure relates to a cellular radiotelephone signal of the type comprising, a principal bidirectional symmetrical channel, comprising a principal uplink path and a principal downlink path, particularly to guarantee transmission of data at low or medium rate and of the signalling information and commands, at least one auxiliary channel working only in the downlink sense, particularly to guarantee the data transmission at high rates, using a multi-carrier technique which gives a distribution of data over time and frequency, with a sub-frame structure. The beginning of at least one sub-frame in the supplemental channel is offset by a time interval of fixed duration which is not zero ($\Delta t$) with relation to a determined time ($t_0$), fixed in the principal channel, such as to permit a synchronization at the sub-frame level of the supplementary channel in a terminal, by instantaneous detection of said determined time ($t_0$) and addition of said time interval ($\Delta t$).

22 Claims, 1 Drawing Sheet

U.S. PATENT DOCUMENTS

| | | | | |
|---|---|---|---|---|
| 6,115,354 | A | 9/2000 | Weck | 370/203 |
| 6,515,960 | B1* | 2/2003 | Usui et al. | 370/203 |
| 6,628,640 | B1* | 9/2003 | Sugaya | 370/348 |
| 6,731,673 | B1* | 5/2004 | Kotov et al. | 375/145 |
| 6,847,630 | B2* | 1/2005 | Blanz et al. | 370/350 |
| 6,856,611 | B2* | 2/2005 | Chaudhuri et al. | 370/335 |
| 6,862,451 | B1 | 3/2005 | Alard | 455/450 |
| 6,940,827 | B2* | 9/2005 | Li et al. | 370/278 |
| 6,952,589 | B1* | 10/2005 | Mantha | 455/501 |
| 7,092,440 | B1* | 8/2006 | Dress et al. | 375/140 |
| 7,379,430 | B2* | 5/2008 | Duplessis et al. | 370/281 |
| 2002/0159413 | A1* | 10/2002 | Tsubouchi et al. | 370/335 |
| 2002/0181439 | A1* | 12/2002 | Orihashi et al. | 370/350 |
| 2002/0187749 | A1* | 12/2002 | Beasley et al. | 455/41 |
| 2003/0063597 | A1* | 4/2003 | Suzuki | 370/347 |
| 2003/0067899 | A9* | 4/2003 | Chen et al. | 370/335 |
| 2003/0081538 | A1 | 5/2003 | Walton et al. | 370/206 |
| 2004/0181569 | A1* | 9/2004 | Attar et al. | 709/200 |
| 2005/0063345 | A1* | 3/2005 | Wu et al. | 370/335 |
| 2006/0171345 | A1* | 8/2006 | Hildebrand et al. | 370/319 |

FOREIGN PATENT DOCUMENTS

WO     WO 00/77961     12/2000

OTHER PUBLICATIONS

International Search Report dated Jun. 15, 2005 for corresponding International Application No. PCT/FR2005/000319, filed Feb. 10, 2005.

French Search Report dated Oct. 20, 2004 for corresponding French Application No. FR 0401545, filed on Feb. 16, 2004.

International Preliminary Report on Patentability and Written Opinion dated Nov. 1, 2006 for corresponding International Application No. PCT/FR2005/000319, filed Feb. 10, 2005.

* cited by examiner

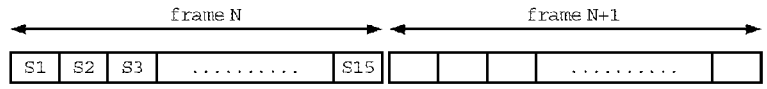
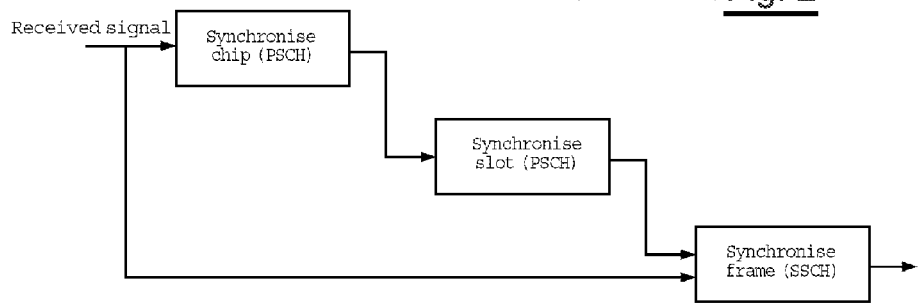
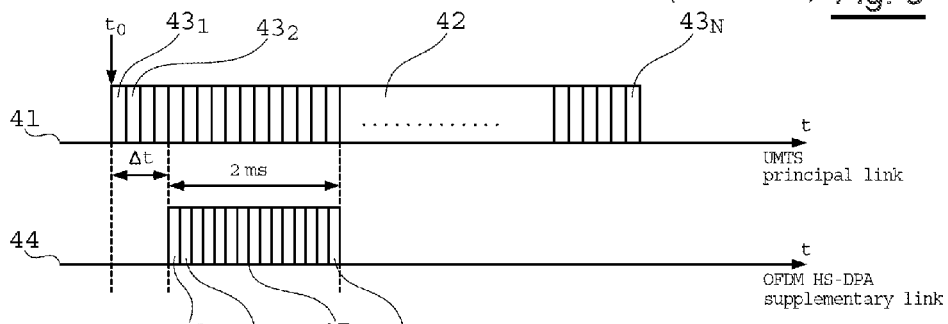
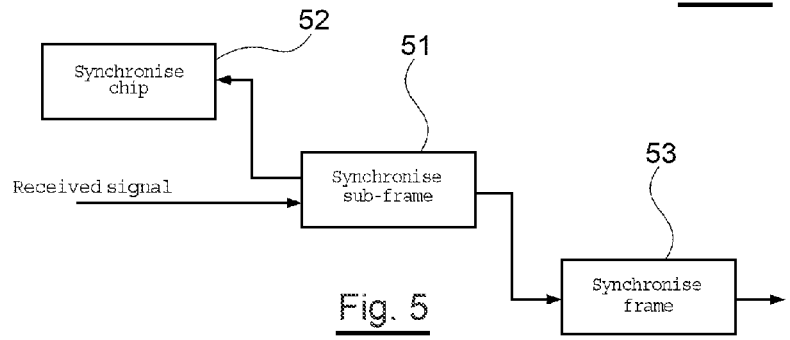

CELLULAR RADIOTELEPHONE SIGNAL PERMITTING SYNCHRONIZATION OF A SUPPLEMENTARY CHANNEL BY MEANS OF A PRINCIPAL CHANNEL AND CORRESPONDING METHOD, TERMINAL AND BASE STATION

CROSS-REFERENCE TO RELATED APPLICATION

This Application is a Section 371 National Stage Application of International Application No. PCT/FR2005/000319, filed Feb. 10, 2005 and published as WO 2005/084062 on Sep. 9, 2005, not in English.

FIELD OF THE DISCLOSURE

The field of the disclosure is cellular radiotelephony. More precisely, the disclosure relates to transmission of data in a radiotelephony system, particularly at high speeds.

BACKGROUND

Known radiotelephony systems such as G.S.M are dedicated essentially to voice communications. They use a channel comprising two symmetric channels, namely a downlink channel (from an earth base station to a mobile station) and an uplink channel (from the mobile station to the base station).

Systems under development are also based on such a structure. Thus, the UMTS standard defined by the ETSI allows a symmetric distribution between the downlink channel and the uplink channel.

It is also proposed to complete the radiotelephony system by adding at least one supplementary channel to the principal channel, in the down direction only and dedicated to transmission of high speed data such as files transmitted on the Internet network.

In order to simplify the situation, the following describes the disadvantages of prior art with relation to this particular application mentioned above. However, it is clear that this discussion could be transposed to other radiotelephony systems including a symmetric two-directional principal channel and at least one supplementary channel.

Remember that the HS-DPA (High-Speed Downlink Packet Access) supplementary link is a high speed downlink associated with a UMTS principal link. It is intended to increase the downlink speed to provide services requiring high speed (multimedia, video streaming, etc.).

As shown in FIG. 1, the UMTS principal link has a structure organized in N, N+1 frames each comprising 15 slots (time intervals) S1 to S15. As shown in FIG. 2, the HS-DPA supplementary link has a structure organized into N, N+1 frames each comprising up to 5 sub-frames SF1 to SF5. Moreover, each slot or sub-frame comprises a set of symbols, and each symbol comprises a set of signal units (chips).

For the physical layer of the HS-DPA supplementary link, two technical solutions are suggested:
  a spectrum spreading system conforming with the UMTS system;
  a system based on an OFDM multicarrier modulation.

With the first solution, an UMTS HS-DPA supplementary link is obtained that is inherent to the UMTS system. Therefore, it can benefit from all the techniques already used by the UMTS principal link, such as channel estimation, control of power and clocks, and particularly synchronization made with the CPICH signal specified in the UMTS standard.

With the second solution, the result is an OFDM HS-DPA supplementary link that uses a modulation different from that used in the UMTS system (spectrum spreading, CDMA). Consequently, it cannot use all techniques used in the UMTS system. Therefore, it must use specific techniques so as to accomplish the same functions. Nevertheless, some adaptation to the context can facilitate setting up and maintaining communication with the OFDM link.

An OFDM sub-frame of the OFDM HS-DPA supplementary link and a UMTS sub-frame of the UMTS HS-DPA supplementary link have the same duration, namely 2 ms, and are interchangeable. The OFDM HS-DPA and UMTS HS-DPA supplementary links may each use a distinct clock (or time base) but their architectures are such that the beginning and end of the OFDM and UMTS sub-frames are identical.

Synchronization in time is one of the key elements in setting up a communication. This synchronization is broken down into several "layers" due to the nature of the radiomobile cellular communication system that defines the two entities; sub-frame and frame (see FIG. 2). Thus, for the HS-DPA supplementary link, this synchronization is divided into several steps:
  synchronization at chip level, that consists of finding the position of symbols (and therefore of chips included in these symbols) depending on the clock used;
  synchronization at sub-frame level, that consists of finding the beginning of sub-frames;
  synchronization at frame level, that consists of finding the beginning of each frame.

The UMTS HS-DPA supplementary link may be synchronized relatively easily. Since the UMTS HS-DPA supplementary link is intimately linked to the UMTS system, it can be synchronized directly based on the UMTS principal link. Thus, initial synchronization of the UMTS HS-DPA supplementary link at the chip may be done by a temporal self-correlation on a specific synchronization signal (PSCH) provided in the UMTS. After acquiring this synchronization at chip level, the UMTS HS-DPA supplementary link can be synchronized at sub-frame level by making a search for the beginning of the UMTS slots (knowing that each sub-frame contains a predetermined number of UMTS slots, for example 3). This search is done using the PSCH signal. This signal is in the form of a packet of 256 identical chips sent at the beginning of each slot. Finally, the frame of the UMTS HS-DPA supplementary link is synchronized using the SSCH (Secondary Synchronization Channel) signal that has the same shape as the PSCH signal except that packets of 256 chips transmitted are modulated by known information. FIG. 3 shows the order of the different synchronization steps of the UMTS HS-DPA supplementary link at chip, slot and frame levels respectively.

On the other hand, synchronization of the OFDM HS-DPA supplementary link is now more difficult because, unlike the UMTS HS-DPA supplementary link, the OFDM HS-DPA supplementary link is not intimately linked to the UMTS system. According to the current technique, the OFDM HS-DPA supplementary link can be synchronized at chip level using the delay interval that represents a part of the OFDM symbol (the last part). This synchronization at chip level is obtained by a simple conventional self-correlation on the received OFDM HS-DPA signal. But, once this synchronization has been done at chip level, it is impossible to know the beginning of the sub-frames and frames because the OFDM signal specified in the HS-DPA frame does not contain the PSCH and SSCH signals necessary for synchronizations at sub-frame and frame levels. According to the existing technique, synchronization of the OFDM HS-DPA supplementary link at sub-frame level is specific to the OFDM system and is based on insertion of signals specific to synchronization at sub-frame level. The major disadvantage of current art is that the above-mentioned specific signals increase the load of the OFDM HS-DPA supplementary link.

SUMMARY

An embodiment of the disclosure relates to a cellular radio-telephony signal of the type including:
- a two-directional symmetric principal channel including a principal uplink channel and a principal downlink channel, particularly for low or medium speed transmission of signalling and control data and information;
- at least one supplementary channel assigned to the downlink only, particularly for transmission of data at high speed, making use of a multicarrier technique for distribution of data in the time/frequency space, and with a sub-frame type structure.

According to an embodiment of the invention, the beginning of at least one sub-frame of the supplementary channel is offset by a time interval with a determined duration not equal to zero ($\Delta t$) with respect to a determined time ($t_0$) on the principal channel, so as to enable synchronization of the supplementary channel at sub-frame level in a terminal, by detection of said determined time ($t_0$) and by adding said time interval ($\Delta t$).

Therefore, the general principal of the embodiment of the invention is to align sub-frames of the supplementary channel in time with a known reference time ($t_0$) identified on the principal channel and that can therefore be determined on a terminal (receiver).

The time interval ($\Delta t$) and the time ($t_0$) determined on the principal channel are either known in advance by the terminal (receiver), or are sent to the receiver dynamically through the principal channel (see the different embodiments of the invention discussed in detail below).

In a first advantageous embodiment of the invention, the structure of the principal channel is organized in frames and the determined time ($t_0$) on the principal channel is a beginning of a frame of the principal channel.

Advantageously, the beginning of each frame of the principal channel forms a determined time ($t_0$).

According to one advantageous variant, the beginning of only some frame(s) of the principal channel called the synchronization frames forms a determined time ($t_0$).

In this variant, the terminal must be able to identify each synchronization frame among all frames that it receives on the principal channel.

To achieve this, the principal channel and/or the supplementary channel advantageously transmit(s) identification data of at least one synchronization frame.

In particular, this means that a choice of synchronization frames is not fixed in advance. However, it is clear that an embodiment of the invention also relates to the case in which the choice of synchronization frames is fixed in advance, and in which the terminal is informed once and for all.

In a second advantageous embodiment of the invention, it is assumed that the principal channel has a structure organized in frames each including a plurality of slots, then the time ($t_0$) determined on the principal channel is a beginning of a slot of the principal channel.

Advantageously, the beginning of only some slot(s) of the principal channel called the synchronization slots, forms a determined time ($t_0$).

The terminal must be capable of identifying each synchronization slot among all the slots that it receives on the principal channel.

To achieve this, the principal channel and/or the supplementary channel advantageously transmit(s) identification information of at least one synchronization slot.

In this way, in particular it is possible to not fix a choice of synchronization slot in advance. However, it is clear that an embodiment of the invention also relates to the case in which the choice of synchronization slots is fixed in advance, and in which the terminal is informed about this choice once and for all.

Considering the case in which the principal channel has a structure organized in frames each comprising a plurality of slots, each slot including a plurality of signal units (chips), then the determined duration of said time interval ($\Delta t$) is preferably equal to k times the duration of a signal unit, where k is an integer number. Advantageously, this number k is equal to 256.

Advantageously, the principal channel and/or the supplementary channel transmit(s) information about said duration of the time interval ($\Delta t$).

In particular, this makes it possible to not fix the duration of the time interval ($\Delta t$) in advance. However, it is clear that an embodiment of the invention also relates to the case in which this duration is fixed in advance, and in which the terminal is informed once and for all.

Preferably, the principal channel and/or the supplementary channel transmit(s) information about the rank within a frame of the structure of the supplementary channel, a sub-frame for which the beginning may be detected, so as to enable synchronization of the supplementary channel at frame level by detecting the beginning of the next frame as a function of said synchronization at sub-frame level and said information about the rank of said sub-frame.

Advantageously, the principal channel and/or the supplementary channel also transmit(s) information related to the mode of transmitting sub-frames on the supplementary channel, said synchronization at frame level of the supplementary channel also depending on said information about the transmission mode.

In one advantageous embodiment of the invention, the principal channel uses a spectrum spreading access technique (CDMA) and is preferably a UMTS link. Moreover, for example, said supplementary channel uses a multicarrier technique based on an OFDM modulation or an IOTA modulation.

The principle and use of the IOTA modulation are described in a French patent application FR 95 05455, corresponding to U.S. Pat. No. 6,278,686, incorporated herein by reference.

Advantageously, the principal channel firstly transmits a notification prompting said terminal to perform said synchronization at sub-frame level of the supplementary channel, to swap the terminal from the principal channel to the supplementary channel.

Note that this notification procedure (that preferably uses the paging channel of the principal channel) can be used to start any type of synchronization procedure at the sub-frame level of the supplementary channel, and therefore also the above-mentioned conventional procedure (in other words based on specific synchronization signals transmitted on the supplementary channel and not on time interval ($\Delta t$) concepts and time ($t_0$) concepts as in this embodiment of the invention).

Therefore, in the context of this an embodiment of the invention, this notification prompts the terminal to detect the determined time ($t_0$) on the principal channel.

Advantageously, said notification comprises information about said duration of the time interval (Δt) and/or said determined time ($t_0$) on the principal channel.

Preferably, said notification is transmitted to a paging channel included in said principal channel.

An embodiment of the invention also relates to a synchronization process for a supplementary channel associated with a symmetric two-directional principal channel, this process using the above-mentioned cellular radiotelephony signal. This process comprises a synchronization step of the supplementary channel at sub-frame level, itself including the following steps:

- detect a determined time ($t_0$) on the principal channel;
- obtain the beginning of a sub-frame of the supplementary channel, by offsetting the detected time ($t_0$) by a time interval with a determined duration not equal to zero (Δt).

Advantageously, said duration of the time interval (Δt) and/or said determined time ($t_0$) on the principal channel is (are) fixed and known to said terminal.

According to one advantageous variant, said duration of the time interval (Δt) and/or said determined time ($t_0$) on the principal channel is (are) variable, and the principal channel and/or the supplementary channel transmit(s) information about said duration of the time interval (Δt) and/or said time ($t_0$).

Advantageously, said method also includes a preliminary step in which a notification is transmitted through the principal channel prompting said terminal to do said synchronization at sub-frame level of the supplementary channel, so as to swap the terminal from the principal channel to the supplementary channel.

An embodiment of the invention also relates to a terminal using such a cellular radiotelephony signal. This terminal includes means of synchronization of the supplementary channel at sub-frame level, themselves including:

- means of detecting a determined time ($t_0$) on the principal channel:
- means of obtaining the beginning of a sub-frame of the supplementary channel, by offsetting the detected time ($t_0$) by a time interval with determined duration not equal to zero (Δt).

An embodiment of the invention also relates to a base station using such a cellular radiotelephony signal. This base station includes means of offsetting the beginning of at least one sub-frame level of the supplementary channel, by a time interval with determined duration not equal to zero (Δt) from a determined time ($t_0$) on the principal channel, so as to enable synchronization of the supplementary channel at sub-frame level, in a terminal, by detection of said determined time ($t_0$), and adding said time interval (Δt).

Other characteristics and advantages will become clear after reading the following description of a preferred embodiment of the invention given as an informative and non-limitative example and the appended drawings.

BRIEF DESCRIPTION OF THE DRAWINGS

FIG. 1 shows the known structure of a UMTS principal link organized in frames and slots;

FIG. 2 shows the known structure of a US-DPA (OFDM or UMTS) supplementary link organized in frames and sub-frames;

FIG. 3 shows relations between the three synchronizations of the UMTS HS-DPA supplementary link at chip, slot and frame levels respectively, within the framework of known art;

FIG. 4 shows a cellular radiotelephony signal according to a particular embodiment of the invention, in which the reference time ($t_0$) is the beginning of a frame of the UMTS principal link;

FIG. 5 shows relations between the three synchronizations of the OFDM HS-DPA supplementary link at chip, sub-frame and frame levels respectively, within the framework of the technique used in the invention.

DETAILED DESCRIPTION OF ILLUSTRATIVE EMBODIMENTS

Within the framework of an embodiment, it is assumed that the radiotelephony system is of the type comprising a symmetric two-directional principal channel and at least one supplementary channel like that mentioned above.

It is also assumed that the supplementary channel uses a multicarrier technique assuring distribution of data in time/frequency space and has a sub-frame type structure.

More precisely, the disclosure relates to a technique enabling synchronization of the supplementary channel at sub-frame level, in a terminal of a radiotelephony system like that mentioned above.

The disclosure is particularly but not exclusively applicable to synchronization of an OFDM HS-DPA supplementary link (supplementary channel) associated with the UMTS principal link (symmetric two-directional principal channel), at sub-frame level.

The example considered in the remainder of the description is the case of a cellular radiotelephony signal including a UMTS principal link (symmetric two-directional principal channel) and an OFDM HS-DPA supplementary link (supplementary channel).

An embodiment of the invention defines the characteristics of this signal, used to facilitate synchronization at the sub-frame level and at chip and frame levels, of the OFDM HS-DPA supplementary link.

FIG. 4 shows a cellular radiotelephony signal set according to a particular embodiment of the invention.

A first time axis 41 shows the UMTS principal link. A single frame 42 of this link is shown, in order to simplify the figure. Conventionally (see the discussion in FIG. 1 above), this frame 42 includes a plurality of slots (not shown), themselves including a plurality of chips (signal units) $43_1$ to $43_N$.

A second time axis 44 shows the OFDM HS-DPA supplementary link. A single sub-frame 45 of this link is shown, for simplification purposes. For example, it has a duration of 2 ms. Conventionally (see discussion about FIG. 2 above), this sub-frame 45 includes a plurality of chips (signal units) $46_1$ to $46_M$.

In this embodiment of the invention, the frame 42 of the UMTS principal link plays the role of a "synchronization frame" at the sub-frame of the ODFM HS-DPA supplementary link. This translates the fact that the beginning of the sub-frame 45 of the OFDM HS-DPA supplementary link is offset by a time interval Δt with a determined duration not equal to zero from the time $t_0$ at the beginning of the frame 42 of the UMTS principal link.

Thus, a terminal that receives this cellular radiotelephony signal can easily perform synchronization at the sub-frame of the OFDM HS-DPA supplementary link included in this signal.

All that is necessary is for the terminal to detect the start time $t_0$ of the frame 42 of the UMTS principal link that it receives, and offset this time $t_0$ by the duration of the time interval Δt (that it knows by assumption), thus obtaining the start time of the sub-frame 45 of the OFDM HS-DPA supplementary link that it also receives.

The duration of the time interval (Δt) may be fixed and known to the terminal. For example, this duration may be equal to 256 chips, which corresponds to a pilot symbol time.

According to one variant, it can be variable and the UMTS principal link transmits information about this duration, so that the terminal can become familiar with it. It would also be possible to plan for this information to be transmitted either by an OFDM HS-DPA supplementary link, alone or in combination with the UMTS principal link.

Similarly, the choice of frames for the UMTS principal link that act as synchronization frames (in the sense mentioned above) may be fixed and known to the terminal. For example, all frames of the UMTS principal link are synchronization frames.

According to one variant, the UMTS principal link transmits identification information of the synchronization frames. For example, a frame of the UMTS principal link can transmit information indicating that the next frame of the UMTS principal link is a synchronization frame. It would also be possible for this information to be transmitted by the OFDM HS-DPA supplementary link alone or in combination with the UMTS principal link.

FIG. 5 shows the relations between the three synchronizations of the OFDM HS-DPA supplementary link at chip, sub-frame and frame levels respectively, within the framework of the technique used in an embodiment of the invention.

As described above with reference to FIG. 4, the cellular radiotelephony signal according to an embodiment of the invention can be used to simply synchronize the OFDM HS-DPA supplementary link reference 51 in FIG. 5, at sub-frame level.

Note that once this synchronization has been obtained at sub-frame level 51, synchronization at chip level (reference 52 in FIG. 5), is also obtained. In other words, there is no need to firstly synchronize the OFDM HS-DPA supplementary link at chip level. Obtaining information at the beginning of a sub-frame of the OFDM HS-DPA supplementary link according to an embodiment of the invention also provides information about the sampling point of the first chip included in the first symbol of this sub-frame.

Optionally, the cellular radiotelephony signal according to an embodiment of the invention also makes it simple to synchronize the OFDM HS-DPA supplementary link reference 53 in FIG. 5 at frame level, after synchronization has been done at sub-frame level 51.

This assumes for example that the terminal knows:
 the rank of the sub-frame 45 for which the beginning is detected in the synchronization step 51 in the sub-frame of the OFDM HS-DPA supplementary link, within an OFDM HS-DPA supplementary frame;
 the sub-frame transmission mode on the OFDM HS-DPA supplementary link. There may be several modes: transmission of all sub-frames, one frame out of three, etc.

The terminal can detect the beginning of the next frame of the OFDM HS-DPA supplementary link, starting from the above-mentioned rank, the above-mentioned transmission mode and synchronization at sub-frame level.

For example, the terminal can know the above-mentioned rank and transmission mode through the transmission of information related to this rank and this transmission mode, through the UMTS principal link. It would also be possible for this information to be transmitted through the OFDM HS-DPA supplementary link, alone or in combination with the UMTS principal link.

It is clear that many other embodiments of the invention would be possible.

In particular, it would be possible for reference times to be the beginning of all or only some of the slots of the UMTS principal link.

It would also be possible that the UMTS principal link firstly transmits a notification inviting the terminal to do synchronization at the sub-frame of the OFDM HS-DPA supplementary link, so that the terminal can change over from the UMTS principal link to the OFDM HS-DPA supplementary link. Optionally, this notification includes information related to the duration of the time interval (Δt) and/or the determined time ($t_0$) on the principal link.

For example, this notification is transmitted on the paging channel (PICH "Paging Indicator CHannel) included in the UMTS principal link. Remember that the PICH channel belongs to the UMTS system and is composed of 300 bits (b0, . . . b299) transmitted during the period of a 10 ms frame. The length of the spread sequence used is 256. The last 12 bits (b288, . . . b299) are not used in the UMTS standard and are therefore free. These 12 bits may for example be used as follows, in order to notify the changeover to the OFDM HS-DPA supplementary link:
 4 bits for notification of the changeover to the supplementary link (these bits may contain information about the carrier frequency of the supplementary channel);
 4 bits to indicate the time $t_0$; this gives 16 possibilities that can indicate any one of the 15 UMTS slots in a frame;
 4 bits to indicate the time interval Δt.

An embodiment of the disclosure is intended specifically to compensate for this major disadvantage with the state of the art.

More precisely, an embodiment provides a new technique to facilitate synchronization of the supplementary channel of a cellular radiotelephony system at sub-frame level (particularly an OFDM HS-DPA supplementary link associated with a UMTS principal link).

An embodiment provides such a technique that does not require the addition of signals specific to synchronization at sub-frame level, or limits it, and maintains the structure initially defined for the supplementary channel.

An embodiment provides such a technique that is easy to implement and inexpensive.

An embodiment also provides such a technique that does not require previous synchronization of the supplementary channel at chip level.

An embodiment also supplies such a technique that makes synchronization of the supplementary channel at frame level easy.

The invention claimed is:

1. A synchronization process by a terminal of a supplementary channel associated with a symmetric two-directional principal channel, said supplementary channel and said symmetric two-directional principal channel being different in nature and being implemented by a same base station,
 said symmetric two-directional principal channel comprising a principal uplink channel and a principal downlink channel, particularly for low or medium speed transmission of signalling and control data and information, said supplementary channel being assigned to the downlink only, particularly for transmission of data at high speed, making use of a multicarrier technique for distribution of data in the time/frequency space, and with a sub-frame type structure, wherein the process comprises:
 a) synchronizing the supplementary channel at sub-frame level, wherein synchronizing is performed by the terminal and includes the following steps:
  1) detecting, by the terminal, a determined time ($t_0$) on the principal downlink channel; and
  2) obtaining, by the terminal, the beginning of a sub-frame of the supplementary channel, by offsetting the determined time ($t_0$) detected in 1) by a time interval with a determined duration not equal to zero ($\Delta t$), wherein the principal channel or the supplementary channel transmit(s) information about a rank within a frame of the structure of the supplementary channel, a sub-frame for which the beginning may be detected, so as to enable synchronization of the supplementary channel at the frame level by detecting the beginning of the next frame as a function of said synchronization at sub-frame level and said information about the rank of said sub-frame.

2. The synchronization process according to claim 1, the structure of the principal channel being organized in frames, wherein the determined time ($t_0$) on the principal channel is a beginning of a frame of the principal channel.

3. The synchronization process according to claim 2, wherein the beginning of each frame of the principal channel forms a respective one of the determined times ($t_0$).

4. The synchronization process according to claim 2, wherein the beginning of only some frame(s) of the principal channel called synchronization frames forms a respective one of the determined times ($t_0$).

5. The synchronization process according to claim 4, wherein the principal channel or the supplementary channel transmit(s) identification information of at least one synchronization frame.

6. The synchronization process according to claim 1, the principal channel having a structure organized in frames each including a plurality of slots, wherein the determined time ($t_0$) on the principal channel is a beginning of a slot of the principal channel.

7. The synchronization process according to claim 6, wherein the beginning of only some slot(s) of the principal channel called the synchronization slots, forms a respective one of the determined times ($t_0$).

8. The synchronization process according to claim 7, wherein the principal channel or the supplementary channel transmit(s) identification information of at least one synchronization slot.

9. The synchronization process according to claim 1, the principal channel having a structure organized in frames each comprising a plurality of slots, each slot comprising a plurality of signal units (chips), wherein the determined duration of said time interval ($\Delta t$) is equal to k times the duration of a signal unit, where k is an integer number.

10. The synchronization process according to claim 9, wherein k is equal to 256.

11. The synchronization process according to claim 1, wherein the principal channel or the supplementary channel transmit(s) information about said duration of the time interval ($\Delta t$).

12. The synchronization process according to claim 1, wherein the principal channel or the supplementary channel also transmit(s) information about a mode of transmitting sub-frames on the supplementary channel, said synchronization at frame level of the supplementary channel also depending on said information about the transmission mode.

13. The synchronization process according to claim 1, wherein the principal channel uses a spectrum spreading access (CDMA) technique.

14. The synchronization process according to claim 1, wherein said supplementary channel uses a multicarrier technique based on an OFDM modulation or an IOTA modulation.

15. The synchronization process according to claim 1, wherein the principal channel firstly transmits a notification prompting said terminal to perform said synchronization of the supplementary channel at sub-frame level, to swap the terminal from the principal channel to the supplementary channel.

16. The synchronization process according to claim 15, wherein said notification comprises information about said duration of the time interval ($\Delta t$) and/or said determined time ($t_0$) on the principal channel.

17. The synchronization process according to claim 15, wherein said notification is transmitted to a paging channel included in said principal channel.

18. The synchronization process according to claim 1, wherein said duration of the time interval ($\Delta t$) or said determined time ($t_0$) on the principal downlink channel is (are) fixed and known to a terminal at which said synchronization process is performed.

19. The synchronization process according to claim 1, wherein said duration of the time interval ($\Delta t$) or said determined time ($t_0$) on the principal downlink channel is (are) variable, and the principal downlink channel or the supplementary channel transmit(s) information about said duration of the time interval ($\Delta t$) or said time ($t_0$).

20. The synchronization process according to claim 1, wherein it includes a preliminary step in which a notification is transmitted through the principal channel prompting a terminal to perform said step of synchronizing at sub-frame level of the supplementary channel, so as to swap the terminal from the principal channel to the supplementary channel.

21. A terminal of a cellular radiotelephony system, said terminal comprising:
a transmitter for transmitting a principal uplink channel,
a receiver for receiving a principal downlink channel, said principal uplink and said principal downlink forming a symmetric two-directional principal channel particularly for low or medium speed transmission of signalling and control data and information, and
a receiver for receiving at least one supplementary channel, said supplementary channel being assigned to the downlink only, particularly for transmission of data at high speed, making use of a multicarrier technique for distribution of data in the time/frequency space, and with a sub-frame type structure, said symmetric two-directional principal channel and said supplemental channel being different in nature, and
a synchronizer, which synchronizes the supplementary channel at sub-frame level, wherein the synchronizer detects a determined time ($t_0$) on the principal downlink channel and obtains the beginning of a sub-frame of the supplementary channel, by offsetting the detected time ($t_0$) by a time interval with a determined duration not equal to zero ($\Delta t$), wherein the principal channel or the supplementary channel transmit(s) information about a rank within a frame of the structure of the supplementary channel, a sub-frame for which the beginning may be detected, so as to enable synchronization of the supplementary channel at the frame level by detecting the beginning of the next frame as a function of said synchronization at sub-frame level and said information about the rank of said sub-frame.

22. A base station of a cellular radiotelephony system, including:
a receiver, which receives a principal uplink channel,
a transmitter, which transmits a principal downlink channel, said principal uplink channel and said principal downlink channel forming a symmetric two-directional principal channel particularly for low or medium speed transmission of signalling and control data and information, a transmitter, which transmits at least one supplementary channel, said supplementary channel being assigned to a downlink only, particularly for transmission of data at high speed, making use of a multicarrier technique for distribution of data in the time/frequency space, and with a sub-frame type structure, said symmetric two-directional principal channel and said supplemental channel being different in nature, means of offsetting the beginning of at least one sub-frame of the supplementary channel, by a time interval with a determined duration not equal to zero ($\Delta t$) from a determined time ($t_0$) on the principal downlink channel, so as to enable synchronization of the supplementary channel at sub-frame level, in a terminal, by detection of said determined time ($t_0$), and adding said time interval ($\Delta t$), wherein the principal channel or the supplementary channel transmit(s) information about a rank within a frame of the structure of the supplementary channel, a sub-frame for which the beginning may be detected, so as to enable synchronization of the supplementary channel at the frame level by detecting the beginning of the next frame as a function of said synchronization at sub-frame level and said information about the rank of said sub-frame.

* * * * *